United States Patent [19]
Hodgkins

[11] 3,753,544
[45] Aug. 21, 1973

[54] APPARATUS FOR MAKING A LIQUID FILTER CARTRIDGE

[75] Inventor: David H. Hodgkins, Manchester, Conn.

[73] Assignee: Stanadyne, Inc., Windsor, Conn.

[22] Filed: Nov. 19, 1971

[21] Appl. No.: 200,292

Related U.S. Application Data

[62] Division of Ser. No. 809,059, March 10, 1969, Pat. No. 3,630,382.

[52] U.S. Cl............ 249/141, 249/83, 425/DIG. 812
[51] Int. Cl............................................... B29c 1/14
[58] Field of Search............................ 249/141, 83; 425/DIG. 812

[56] References Cited
UNITED STATES PATENTS

| | | | |
|---|---|---|---|
| 3,431,335 | 3/1969 | Henning | 249/83 X |
| 1,198,569 | 9/1916 | New | 249/141 |
| 1,519,150 | 12/1924 | Mentz | 249/141 X |
| 3,088,753 | 5/1963 | Sendor | 249/83 X |

Primary Examiner—J. Spencer Overholser
Assistant Examiner—Ben D. Tobor
Attorney—Prutzman, Hayes, Kalb & Chilton

[57] ABSTRACT

A ported mold having a peripheral lip is positioned in a backing mold having mold pins centrally disposed in the ports and having recesses surrounding the mold pins. The recesses are filled when a layer of flowable plastics material is placed in the ported mold. The lip of a filter housing is positioned in the ported mold and, with the curing of the plastics material, the ported mold becomes a part of the filter and ported abutments forming an inlet and an outlet for the filter are provided. The mold pins may be of different lengths so that the ports may be open, or sealed by a thin layer of plastics material.

3 Claims, 3 Drawing Figures

Patented Aug. 21, 1973  3,753,544

APPARATUS FOR MAKING A LIQUID FILTER CARTRIDGE

This is a division of application Ser. No. 809,059 filed Mar. 10, 1969, now U.S. Pat. No. 3,630,382.

This invention relates to liquid filters and is particularly concerned with fuel oil filters for compression-ignition engines and to the method and apparatus for the manufacture of such filters.

It is an object of this invention to provide a filter cartridge having integrally molded plastics grommets forming ported struts providing spaced inlet and outlet passages of the filter cartridge. Included in this object is the forming of such grommets from a plastics material initially applied in a flowable state and cured in place during the assembly of a cover plate of the cartridge housing during manufacture.

Another object of this invention is the provision of molding apparatus for shaping and forming such grommets during the sealing of the cover plate on the cartridge housing. Included in this object is the provision of means accommodating the free breathing of the interior of the cartridge housing during the curing of the plastics material.

Another object of the invention is to provide a liquid filter cartridge having a housing and a cover plate wherein a continuous layer of plastics material on the cover plate provides a protective coating for the cover plate, seals it to the housing and to the filter element therein and forms ported struts providing spaced inlet and outlet ports for the cartridge.

Other objects will be in part obvious and in part pointed out more in detail hereinafter.

The invention accordingly consists in the features of construction, combination of elements and arrangement of parts which will be exemplified in the construction hereafter set forth.

Figure 1:
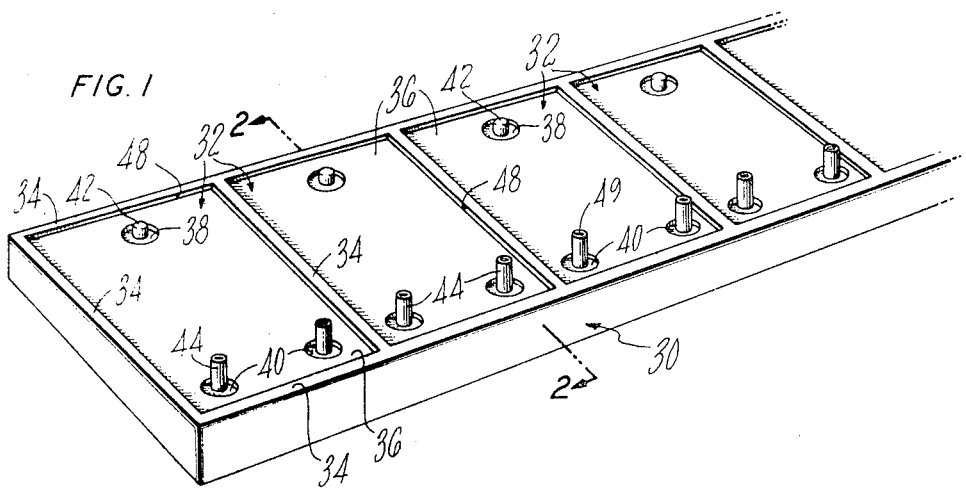
FIG. 1 is a perspective view partially broken away of a mold suitable for the practice of my invention.

Referring now to the drawings in detail, a filter cartridge of the type contemplated by this invention comprises a cup-shaped housing 10, suitably formed of glass, in which is positioned an accordian pleated filter element 12 formed of a strip of sheet filter material folded along transverse fold lines 14, 16 so that the pleats form a series of pockets which are open at the ends 18, 20 thereof.

A filter element so pleated is positioned within the housing 10 and the ends 18, 20 of the pockets respectively bonded to the bottom of the housing 10 and the cover plate 22, suitably formed of sheet steel, and the ends of the terminal plates bonded to a side wall of the housing as along line 24 to define spaced inlet and outlet chambers 26, 28 isolated from each other by the filter element.

In the practice of this invention there is preferably provided, as shown in FIG. 1, a mold 30 having a plurality of recesses 32 bounded by short upstanding side walls 34 and flat bottom surfaces 36. The bottom surfaces 36 are provided with spaced recesses 38, 40 which are shown as being of circular configuration.

Centrally disposed in each of the recesses 38, 40 are mold pins 42, 44 respectively. The mold pins 42 are imperforate and have top surfaces which may be partispherical, or geneally flat and bounded by gently curved radii 46. Mold pins 42 extend above bottom wall 36 of the mold recesses 32 for purposes hereinafter more fully described. The mold pins 44 project a greater distance above the bottom wall 36 of the mold that the mold pins 42 and are provided with central apertures 49 for purposes also hereinafter more fully described and, as illustrated, the mold pins 44 are secured to the mold base 30 by a threaded connection. It is readily apparent, however, that the pins 42, 44 may be secured to the mold 30 in any suitable manner or formed integrally with the mold base.

Figure 2:
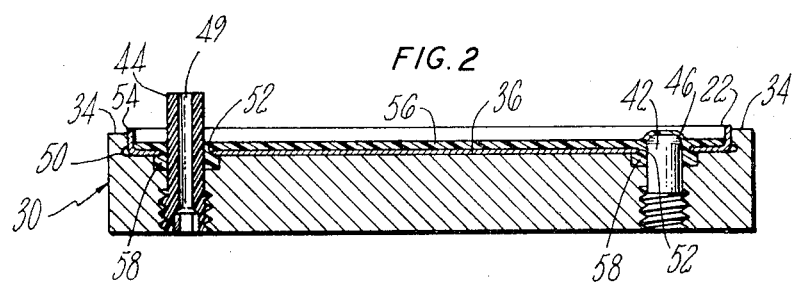
FIG. 2 is a cross-sectional view taken along the line 2—2 of FIG. 1 showing a filter cartridge cover plate positioned in the mold in one stage of manufacture according to the invention.

As shown in FIG. 2, the walls 34 of the mold may be provided with a peripheral undercut or recess 50 to receive any dirt or contaminants which might be present on the mold 30 or the cover plate 22 during the molding process, and the side walls 48 may be constructed to provide some resiliency so as to accommodate cover plates 22 of slightly varying dimensions or to releasably grip the cover plates 22 when positioned in the mold during the molding process.

In the practice of this invention, a cover plate 22 having apertures 52, conforming in number and location to the mold pins 42, 44, and a peripheral lip 54, shaped to closely nest within the walls 34 of the mold recesses 32, is positioned in each of the recesses 32 of the mold 30 with the flat portion of the cover plates in engagement with the bottom wall 36 of the recesses. The apertures 52 are made oversize relative to the mold pins 42, 44 to provide an annular clearnace therewith.

A continuous layer 56 of a plastics material is then applied, as by pouring or spreading such a material in a flowable state, onto the upper surface of the cover plate taking care to cover the top surfaces of the pins 42 which extend above the base wall 36 of the mold cavities a sufficient distance to project, say one-eighth inch, above the top surface of the cover plate 22. The layer should be at least about 40 mils in thickness, and about 60 to 80 mils thick to accommodate any lack of flatness in cover plate 22 and any unevenness in the edge 20 of the pleated filter element 12 and still embed the edge 20 of the filter element continuously from one end to the other. By the use of a plastics material having the proper viscosity and curing characteristics as hereinafter described, a thin unbroken layer of the plastics material, which is easily pierced when the cartridge is placed in use, will cover the top surfaces of the pins 42 after curing. The flowable plastics material will also flow into and fill the annular recesses 38, 40 surrounding the pins 42, 44, respectively. In effect, the cover plate forms a mold for confining the layer 56 of plastics material and becomes a permanent part of the completed filter cartridge, and the mold 30 is a reusable back mold which confines the plastics material in recesses 38, 40 until cured.

The cover plate is then ready to receive the cup-shaped cartridge housing 10 in which the filter element 12 is assembled. Upon the assembly of a cartridge housing into final position relative to the cover plate 22 in each of the mold recesses 32, the plastics material is cured to complete the manufacture of the filter cartridge by sealing the cover plate to the peripheral lip of the cup-shaped housing 10 and to the filter element 12. By virtue of the continuous coating of the cured plastics material on the inner surface of the cover plate 22, a protective covering is provided to protect it from any harmful effects of contact with the liquid to be filtered. Accordingly, where used for filtering fuel oil containing entrained water and sulphur, the cover plate can be made of an inexpensive material such as unprotected sheet steel without rusting or corrosion. Curing also results in the solidifying of the plastics material in the recesses 38, 40 to form ported resilient struts 58 providing spaced inlet and outlet ports for mounting and sealing the filter cartridge on a supported base.

A plastics material suitable for use in the practice of this invention is preferably an initially flowable thermosetting resin having high bonding strength for the metal, glass and paper components to be bonded together. After curing, the plastics material should also be tough, have high chemical resistance, thermal stability and good ageing characteristics so that it maintains its bonding strength under the load, vibration, thermal and chemical stresses encountered in use in the presnece of the liquid to be filtered. A heat curing plastisol, i.e., a dispersion of polyvinyl chloride resins, is a thermosetting plastics material suitable for use in this invention.

I have found that such a plastisol having a viscosity at room temperature such that it will form a layer of about 35 mils thick on a flat surface when unconfined is particularly suitable for this application since it will assure the formation of a continuous thin impervious layer 5 to 15 mils thick over the tops of the mold pins 42 following the heat curing thereof despite any momentary decrease in viscosity of the plastisol as it begins to set. In this regard, the smoothly curved corners 46 on the tops of mold pins 42 prevent any break in the continuity of the cured layer when a plastisol having a room temperature viscosity at the presecribed level is used.

The edge 18 of the filter element 12 may be bonded to the bottom of the cup-shaped housing 10 by a similar layer of plastisol initially positioned between the locating rib and the opposite side wall of the housing 10. Such bonding may be accomplished by a heat cure prior to the mounting of the housing on the cover plate 22. Alternatively, a plastisol of higher viscosity so as to prevent running when positioned upside down as viewed in FIG. 3 may be applied to form the layer 62 and the curing of layer 62 and layer 56 may be achieved at the same time. Where the simultaneous curing of the plastisol is contemplated, the viscoisty of the plastisol forming the layer 62 should be such as to form a layer about 75 mils thick on a flat surface when unconfined.

Figure 3:
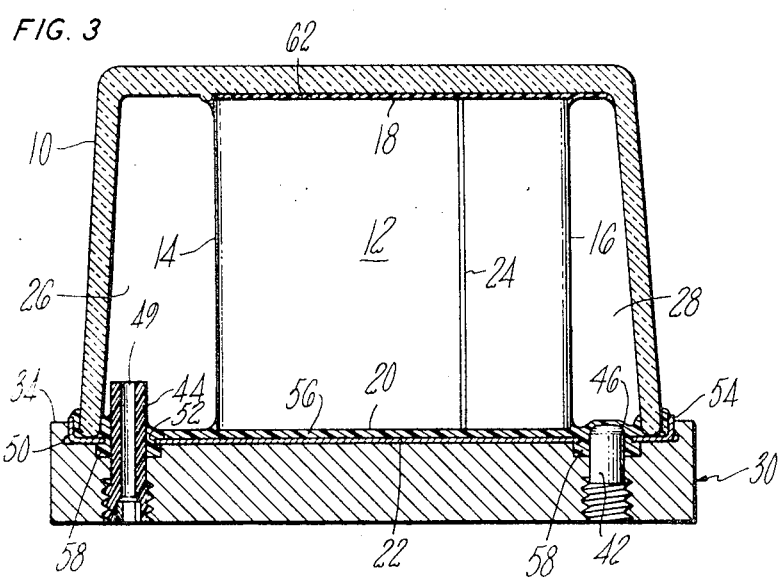
FIG. 3 is a vertical section through the mold and the filter cartridge in a subsequent stage of manufacture.

It will be apparent that the air in the cartridge will expand during the heating of the plastisol for five minutes at a temperature of 300°– 325° F. during the curing of the plastisol. Without provision for venting the air, such expansion of the heated air would cause a lateral pressure on the sealing bead between the lip of the housing 10 and the cover plate 22 and may cause a break in the liquid plastisol before it is cured to result in a defective seal. As shown in FIG. 3, the upstanding pins 44 are apertured to provide for the free venting of the cartridge to eliminate this possibility.

Since the plastisol used must have good bonding characteristics, it is essential that the portions of the mold 30 and the mold pins 42, 44, with which the plastisol comes in contact during manufacture, having a surface to which the plastisol will not adhere. This may be accomplished in the practice of this invention by coating these parts with a release agent such as polytetrafluoroethylene which has low surface energy to make these surfaces nonadhesive. While only a surface treatment may be applied to the parts of the mold which may engage the plastisol, the entire mold and the mold pins may be made of solid polytetrafluoroethylene since in this way scratching or abrasion will not penetrate the coating to render it ineffective.

If desired, the recesses 38, 40 may be filled with a plastisol having added plasticizers to increase the resiliency of the struts 58 formed therein and a plastisol without the added plasticizers then applied to form the continous layer 56. In this way, increased resiliency of the struts 58 under the thermal and chemical stresses encountered in use may be obtained without sacrifice of the bonding properties of the layer 56 providing the seal between the glass housing 10, the metal cover plate 22 and the filter paper 12.

If desired, the plastisol may be colored so that the color change during curing will indicate the uniformity and sufficiency of the cure. Where a glass housing 10 is used, the quality of the bonding of the edges of the filter element and the sealing of the cover plate 22 to the housing 10, may be visually examined and any undercuring or overcuring visually detected by the use of a color chart.

From the forgoing it will be apparent that this invention provides a liquid filter cartridge having resilient ported struts providing spaced inlet and outlet ports for mounting the filter and which are formed integrally with a continuous protective membrane or layer on the cover plate, which layer bonds the cover plate to the filter housing and to the filter lelement. The invention further provides an apparatus and method for making a quality filter in an inexpensive manner with the outlet ports of the filter sealed prior to use.

As will be apparent to persons skilled in the art, various modifications and adaptations of the structure above described will become readily apparent wihout departure from the spirit and scope of the invention.

The embodiments of the invention in which an exclusive property or privilege is claimed or defined as follows:

1. Apparatus for making an enclosed liquid filter cartridge having an accordian pleated filter element in a cup-shaped housing with a folded edge of the filter element exposed at the open end of the housing comprising a ported mold for containing a continuous layer of flowable plastics material into which the lip of the housing and the folded edge of the filter element are embedded during assembly, and a back mold for said ported mold having mold pins centrally disposed within the ports thereof, at least one of said pins providing a central vent fro venting the interior of the filter cartridge during the setting of the flowable plastics material, said back mold further providing recesses surrounding said mold pins to receive and confine the flowable plastics material therein.

2. Apparatus as recited in claim 1 wherein one of said mold pins is longer than the others to extend above the layer of said plastics material and provides a central vent.

3. Apparatus as recited in claim 2 wherein the shorter mold pin projects above said ported mold an amount greater than the thickness of the continuous layer but by an amount insufficient to cause a discontinuity in the layer of flowable plastics material over said shorter mold pin.

* * * * *